United States Patent [19]

Brachman

[11] Patent Number: 5,055,498
[45] Date of Patent: Oct. 8, 1991

[54] PLASTIC CRAYON

[75] Inventor: Armand E. Brachman, Emmaus, Pa.

[73] Assignee: Binney & Smith Inc., Easton, Pa.

[21] Appl. No.: 540,102

[22] Filed: Jun. 19, 1990

Related U.S. Application Data

[63] Continuation-in-part of Ser. No. 341,164, Apr. 20, 1989.

[51] Int. Cl.$^5$ .................. C09L 23/06; C08L 23/06; C08L 91/06; C08L 5/09
[52] U.S. Cl. ........................... 523/164; 524/88; 524/190; 524/322; 524/400; 524/427; 524/431; 524/432; 524/445; 524/451; 524/487; 524/489
[58] Field of Search ............... 524/487, 489, 322, 400, 524/431, 432, 427, 445, 451, 164

[56] References Cited

U.S. PATENT DOCUMENTS

| | | | |
|---|---|---|---|
| 3,409,574 | 11/1968 | Gros | 260/23 |
| 3,933,788 | 1/1976 | Brinkman | 523/164 |
| 4,768,987 | 9/1988 | Usui et al. | 523/164 |

OTHER PUBLICATIONS

Brandrup et al., "*Polymer Handbook,*" Second Edition, John Wiley & Sons, p. v-21, 1975.

Primary Examiner—Allan M. Lieberman
Attorney, Agent, or Firm—Neuman, Williams Anderson & Olson

[57] ABSTRACT

The solid marking composition of the invention includes from about 15% up to about 50% by weight of a polyethylene resin component having a specific gravity in the range of from about 0.95 up to about 0.96. In addition, the composition of the invention includes from about 20% up to about 55% by weight of a compatible plasticizer, and from about 3% up to about 20% by weight active material of a pigment. Optionally, the composition may include a pigment dispersing agent, such as a fatty acid. Further additives which may advantageously employed include extenders or fillers, oxidation stabilizers, UV stabilizers, and mold release agents. The composition of the invention is fabricated into marking instruments having unexpectedly improved eraseability, ease of application, barrel breaking strength, and tip breaking strength, while eliminating bloom entirely.

30 Claims, No Drawings

PLASTIC CRAYON

This application is a continuation-in-part of my prior application Ser. No. 07/341,164, filed Apr. 20, 1989.

BACKGROUND OF THE INVENTION

1. Field Of The Invention

This invention relates generally to compositions from which writing instruments such as crayons are fabricated and, in particular, to solid marking compositions which incorporate polyethylene resins. The invention further relates to marking instruments, such as crayons, fabricated from such compositions.

2. Brief Description Of The Prior Art

It is well known that crayons can be produced from mixtures of waxes, fatty acids, colorants and extenders. When properly formulated, crayons can be used to draw, write or color. They do, however, suffer from poor eraseability, low breaking strength, low softening point, and rapid wear rate.

Some level of improvement has been reported by the incorporation of various additives. For example, U.S. Pat. No. 2,882,246 teaches that the addition of 0.1 to 10% polyethylene increases the melting point. U.S. Pat. No. 3,933,708 teaches that addition of 0.1 to 10% of a high molecular weight polyethylene allows the use of lower melting point paraffin waxes. U.S. Pat. No. 4,212,676 teaches that one may obtain eraseability by combining "emulsifiable" polyethylenes with a mixture of liquid hydrocarbons, while Japan 1983-4751 teaches that it may be obtained by the use of polyacrylates. Offenlegungsschrift 26 13 933 teaches that one must use a mixture of high density polyethylene or polypropylene and low molecular weight (m.w. < 10,000) polyethylene, in combination with wax and pigment, in order to provide acceptable properties in a colored pencil.

Although these prior teachings indicate that one may produce generally suitable writing instruments from mixtures of wax and blending agents, none teaches how to provide good eraseability coupled with attractive application characteristics, while still preventing bloom. Bloom is the migration of one or more components to the surface of the crayon which results in the formation of a white-gray surface deposit which obscures the true color of the crayon. It is a serious defect in a crayon, since it not only renders the crayon not aesthetically pleasing, but also makes it more difficult for one to select a crayon of a desired color from among several others. In some cases, bloom can develop on the surface of the layer of the crayon composition which has been applied to the paper or other coloring surface.

None of the prior teachings addresses the problem of how to achieve a proper balance of all properties; namely, eraseability, breaking strength, ease of application, and absence of bloom.

In accordance with the foregoing, it is a general object of the present invention to obtain an improved plastic crayon composition.

A related object is to produce a solid marking composition in which all the desirable properties may be optimized.

A more particular object is to obtain a plastic crayon composition having improved eraseability, ease of application, and strength, while bloom is eliminated.

Another object is to produce a solid marking composition having improved eraseability, ease of application, and strength, and essentially no bloom, without the necessity for including additives for that purpose.

Other objects and advantages of the composition of the present invention will be apparent to those skilled in this art from the following description and the appended claims.

SUMMARY OF THE INVENTION

It has now been discovered that one may optimize all properties in a plastic crayon composition, while still preventing bloom, by maintaining the specific gravity of the polyethylene resin component within a specified range, namely, from about 0.95 up to about 0.96. Employing a high density polyethylene resin component permits the formulation of compositions which have unexpectedly improved eraseability, ease of application (smoothness, glide, and color transfer), barrel breaking strength (BBS), and tip breaking strength (TBS), while eliminating bloom entirely.

Thus, the composition of the invention includes from about 15% up to about 50% by weight of a high density polyethylene resin component having a specific gravity in the range of from about 0.95 up to about 0.96. In order to achieve the objects of the invention, the composition should be substantially free of low or medium density polyethylene resins. For the purposes of achieving those objects, the term "substantially free of low or medium density polyethylenes" means that such materials may be included in limited amounts, e.g., up to about 20%, and either a single resin or a blend of resins may be used, including both homopolymers and suitable copolymers, so long as the resin component meets the requirement of having a specific gravity range of at least about 0.95.

In addition, the composition of the invention includes from about 20% up to about 55% by weight of a compatible plasticizer, and from about 3% up to about 20% by weight active material of a pigment.

The composition of the invention may also advantageously include a pigment dispersing agent, such as a fatty acid. Further additives which may advantageously be employed include extenders or fillers, oxidation stabilizers, UV stabilizers, and mold release agents.

DETAILED DESCRIPTION

In the context of the present invention, polyethylene resins are classified as low density (specific gravity of from about 0.90 up to about 0.92), medium density (specific gravity of from about 0.93 up to about 0.94), and high density (specific gravity of from about 0.95 up to about 0.96).

As indicated above, it has been discovered that an improved solid marking composition, such as those from which so-called plastic crayons are fabricated, may be formulated by maintaining the specific gravity of the polyethylene resin component within the range of from about 0.95 up to about 0.96.

The advantageous effect of utilizing a high density polyethylene resin component of a plastic crayon formulation can be quantitatively seen by referring to the following table. Along the left column are listed the desirable properties of a plastic crayon formulation, while along the top row are listed the three general types of polyethylene resins. Each row corresponding to a particular property states the resin concentration ranges in which the particular property can be optimized. These concentrations are stated in terms of weight percent of the resin and plasticizer matrix of the composition. As an example of the information provided by these data, the table shows that eraseability may be optimized at a concentration of a medium density polyethylene component of from about 25% up to about 40% by weight of the resin and wax matrix.

|  | high density | medium density | low density |
| --- | --- | --- | --- |
| absence of bloom | 20–40% | 20–30% | <<30% |
| tip breaking strength | 25–40 | 35–50 | 40–50 |
| eraseability | 20–35 | 25–40 | 30–40 |
| ease of application | 20–30 | 30–40 | 35–50 |

As can clearly be seen from these data, one cannot optimize all four properties of the composition when using a low or medium density polyethylene resin component, since the concentration range in which bloom is eliminated does not overlap the concentration ranges in which the other properties may be optimized. Indeed, this is the specific problem which has not heretofore been recognized, much less solved.

In general, it has been found that the inclusion in the composition of from about 15% up to about 50% by weight of a polyethylene resin component having a specific gravity in the range of 0.95 up to 0.96 produces an acceptable marking composition. A preferred concentration range for this high density polyethylene resin component is from about 20% up to about 40% by weight, while the most preferred range is from about 25% up to about 35% by weight, since, in this range, the optimization of the properties of the composition is best achieved.

The composition of the invention also includes from about 20% up to about 55% by weight of a compatible plasticizer, the function of which is to provide the composition with good application characteristics.

While paraffin waxes are, for economic reasons, the preferred materials for use as plasticizers, a wide variety of materials may be utilized to achieve the same functional characteristics. Among the materials which are functional equivalents of the paraffin waxes are microcrystalline waxes (which may be present in concentrations of up to about 11%), synthetic waxes, vegetable fats and their hydrogenated or sulfonated derivatives, animal fats and their hydrogenated derivatives, fatty esters of glycols, and fatty acid salts of alkali and alkaline earth metals and aluminum.

In order to obtain the most advantageous properties in a plastic crayon formulation, it is preferred that the plasticizer have a melting point in the range of from about 125° F. to 145° F. (51° C. to 63° C.).

Pigments which are useful in the composition of the invention include both inorganic and organic pigments, and mixtures of these materials.

The inorganic pigments which may be used include the conventional ones, such as iron blue, iron oxides, zinc oxide, ultramarine blue, titanium dioxide, and mixtures of these materials.

The organic pigment may be of the azo, naphthol, or phthalo type, including phthalocyanines and carbazoles.

The pigment may further include toners or lakes made from acid or basic dyes, and mixtures of these materials.

For the purposes of the present invention, the pigment should have a particle size in the range of from about 0.1 microns up to about 25 microns. A smaller particle size contributes to more efficient color utilization; consequently, it is preferred that the particle size be in the range of from about 0.3 microns up to about 20 microns. Most preferably, it is in the range of from about 0.5 microns up to about 15 microns.

In general, an acceptable level of color can be obtained when the pigment is present in an amount of from about 3% up to about 20% active material by weight of the composition, though that range is by no means critical.

Optionally, the composition of the invention may include a pigment dispersing agent. The advantage in including this component is that good dispersion of the pigment in the polyethylene matrix results in good glide properties in the plastic crayon made from the composition of the invention.

Suitable pigment dispersing agents are the fatty acids, including both saturated and unsaturated fatty acids, and including either single compounds or mixtures of several. Preferred materials are fatty acids having from 14 to 24 carbon atoms, and most preferred from a functional and cost standpoint is stearic acid.

In order to provide a discernible benefit, the pigment dispersing agent should be present in an amount of at least about 5% by weight of the composition, with a workable concentration range being from about 5% up to about 40% by weight. In the plastic crayon composition of the present invention, it is preferred to have the pigment dispersing agent present in an amount of about 35% by weight of the composition.

The composition of the invention may also advantageously include a filler or pigment extender, and many materials useful for this purpose are well known. A few examples of such materials are calcium carbonate, silica, alumina, talc, clays, and feldspars.

Ordinarily, these pigment extenders or fillers are present in an amount of up to about 20% by weight of the composition, though a preferred concentration in the practice of the present invention is about 10% by weight of the composition.

Another component which may be incorporated into the composition of the invention is a mold release agent, since a writing instrument of a solid, unitary piece of material, such as a plastic crayon, is ordinarily fabricated from the composition by injection molding. Typical mold release agents include the Group IIA metal salts of fatty acids, and a preferred material for use in the present invention is calcium stearate.

Such materials are usually effective at a concentration of from about 0.2% up to about 2% by weight of the composition. In the fabrication of plastic crayon writing instruments by means of injection molding, it is preferred that the mold release agent be present in an amount of from about 0.4% up to about 0.7% by weight of the composition.

Still further additives may be incorporated into the composition of the invention, including, for example, oxidation stabilizers and UV stabilizers.

Typical oxidation stabilizers useful in compositions of this sort are sterically hindered phenols. They ordinarily are effective at concentration levels of from about 0.03% up to about 0.2% by weight.

Typical UV stabilizers useful in compositions of this sort are hindered amine light stabilizers (HALS) and benzotriazoles. They ordinarily are effective at concentration levels of from about 0.1% up to about 2% by weight.

Some specific examples of compositions falling within the scope of the present invention are set forth below, as are test data demonstrating the optimization of properties which is achieved in these compositions.

EXAMPLES

As recited above, a number of properties of a plastic crayon composition are important to judging its acceptability; namely, tip breaking strength, barrel breaking strength, erasability, sharpenability, ease of application, and absence of bloom. Encompassed within the property of ease of application are smoothness, glide, and color transfer. What is achieved by the present invention is a composition in which all of these properties can be optimized.

A composition having an optimal balance of properties is one which performs well enough in each of certain tests that the composition may be said not to have any notable deficiencies. The determination of whether a particular composition meets this standard must be based, therefore, on a consideration of the performance of a writing instrument formed from the composition with respect to each individual criterion in view of all the remaining criteria. The particular tests by which the performance of a composition is judged are described below. In these tests, the composition of the present invention was evaluated in the form of standard crayon sticks having a diameter of 5/16 inch and having a generally conical tip.

Tip Breaking Strength

Tip breaking strength is determined by pushing a horizontal 10 cm by 1.9 cm diameter rod onto the tip of the writing instrument, held horizontally at 90° to the rod, until the tip breaks. The force exerted at the time of breakage is the breaking strength. The horizontal rod is affixed to the upper jaw of an Instron testing machine. The jaw is lowered at a rate of 2.5 cm per minute during the test. The writing instrument is held firmly in a holder, and the instrument is inclined upward 11° 15' from horizontal to simulate a pressure geometry present when writing or drawing. The tip of the instrument extends 1.5 cm out from the holder, and the end of the tip is positioned below the center of the rod affixed to the upper jaw of the testing machine.

The tip breaking strength should be at least 5 pounds to be acceptable, and preferably 6 pounds or higher.

Barrel Breaking Strength

Barrel breaking strength is determined by pushing a horizontal 10 cm by 1.9 cm diameter rod onto the center point of the writing instrument, which is positioned 90° to the rod and is supported on 10 cm by 1.5 cm diameter support rods. The distance between the center lines of the support rods is 6.35 cm. The push rod, affixed to the upper jaw of an Instron testing machine, is lowered at a rate of 2.5 cm per minute. The force exerted a the time of breakage is the breaking strength.

The barrel breaking strength should be at least 9 pounds to be acceptable, and preferably 10 pounds or higher.

Erasability

Erasability is judged by success in removal of a uniform layer of color on a 4.5 cm by 4.5 cm square of 20 lb. bond paper. Other types of paper can be used but will be either more or less easily erased. The color is applied by placing the writing instrument in the vertical position in a holder. A 850g weight is mounted on the holder. The holder is moved back and forth by an electrically driven machine, such that the tip of the instrument marks the paper. At the same time, a cam moves the holder forward in the horizontal direction so that the instrument does not write over previously colored areas.

An Eberhard Faber "Pink Pearl #100" eraser is used to remove color from about a one-half inch guide strip of the colored area. The removal area is rubbed repeatedly with gentle pressure until no more color can be removed, but not so vigorously as to damage the surface of the paper. A numerical rating is assigned based on visual inspection of the erased area:

10 = No color remains.
8 = Slight amount of color remains.
6 = Modest amount of color remains.
4 = Much of the color remains.
2 = Most of the color remains.

Erasability, expressed as a value on a rating scale of 1 to 10, with 10 being best, should be at least 7 to be acceptable, and preferably 8 or higher.

Sharpenability

Sharpenability is judged by sharpening the coloring instrument with a hand held sharpener fitted with a steel cutting blade. Using moderate pressure, one sharpens the point to 1 mm diameter or less. Sharpenability is judged by ability to sharpen to 1 mm without breakage. The force needed to turn the coloring instrument should not be excessive. The shavings should be smooth and fall freely from the sharpener. The numerical rating criteria are as follows:

10 = No breakage, little force is needed for sharpening, the sharpened tip is smooth and uniformly rounded, shavings are almost continuous.
8 = No breakage, some force is needed for sharpening, the sharpened tip is smooth and uniformly rounded, shavings are large
6 = No breakage, some force is needed for sharpening, the sharpened tip is rough and/or non-uniform, shavings are moderate size.
4 = No breakage, considerable force is needed for sharpening
2 = Tip breaks before being reduced to 1 mm diameter.

Sharpenability, expressed as a value on a rating scale of 1 to 10, with 10 being best, should be at least 7 to be acceptable, and preferably 8 or higher.

Ease Of Application

Ease of application is judged by using the coloring instrument to draw and color. The ratings are:

10 = Lays down color uniformly and glides easily across the paper with little pressure.
8 = Same as 10 but requires more pressure to transfer color to the paper.
6 = Lays down color uniformly but has a perceptible drag and/or slight scratchiness.
4 = Lays down color uniformly but has considerable drag and/or scratchiness.
2 = Does not lay down color uniformly and/or has excessive drag or scratchiness.

Ratings are best made by comparison with "standard" crayons that have representative response for each rating level.

Ease of application, expressed as a value on a rating scale of 1 to 10, with 10 being best, should be at least 6 to be acceptable, and preferably 8 or higher.

Bloom

Bloom is judged visually by rubbing a portion of the coloring instrument with a paper wiper and then judging the degree to which the wiped area differs in color from an unwiped area. Bloom manifests itself as a gray-white surface exudate on the surface of the coloring instrument. Some formulations also developed bloom on the surface of colorant present on the surface of paper or other coloring surface.

The presence of bloom is expressed as none, slight, moderate or heavy. As a practical matter, any amount of bloom is highly undesirable.

With low density polyethylene having either a low or a relatively high melt index, it was found that increased levels of stearic acid caused increased tendency toward bloom, as shown in the following examples. In each instance, the weight percentages of the polyethylene and stearic acid components are stated on the basis of weight percent of the resin, wax, and stearic acid matrix.

EXAMPLE #1

| 30% 0.2 melt index low density polyethylene | | |
|---|---|---|
|  | A | B |
| stearic acid | 25% | 35% |
| tip breaking strength | 6.1 | 6.2 |
| barrel breaking strength | 8.0 | 10.4 |
| erasability | 8.9 | 8.8 |
| sharpenability | 10.0 | 10.0 |
| ease of application | 8.1 | 8.4 |
| bloom | none | slight |

EXAMPLE #2

| 40% 6 melt index low density polyethylene | | |
|---|---|---|
|  | A | B |
| stearic acid | 20% | 35% |
| tip breaking strength | 7.1 | 6.8 |
| barrel breaking strength | 13.0 | 11.4 |
| erasability | 8.9 | 8.9 |
| sharpenability | 10.0 | 10.0 |
| ease of application | 8.4 | 8.1 |
| bloom | very slight | moderate |

While the formulation of Example 1A exhibited no bloom, it has insufficient barrel breaking strength. Moreover, when a very high melt index (M.I.=400) low density polyethylene is used, the increased tendency toward bloom at higher stearic acid levels is not noticeable because there is heavy bloom, even at low resin levels.

With high density polyethylene, however, there was no bloom at all, even at stearic acid levels of up to 48%, as is shown in the following data for Examples 3 through 15.

EXAMPLE ##3-7

|  | Example | | | | |
|---|---|---|---|---|---|
|  | 3 | 4 | 5 | 6 | 7 |
| 17 melt index high density polyethylene | 25% | 30% | 25% | 30% | 30% |
| stearic acid | 20% | 28% | 36% | 38% | 48% |
| erasability | 8.5 | 9.0 | 8.7 | 8.8 | 8.9 |
| ease of application | 8.3 | 6.8 | 8.5 | 6.6 | 8.1 |
| tip breaking strength | 7.4 | 8.3 | 6.3 | 7.4 | 8.0 |
| barrel breaking strength | 11.5 | 12.8 | 9.2 | 13.7 | 12.8 |
| sharpenability | 9.5 | 9.0 | 7.0 | 10.0 | 10.0 |
| bloom | none | none | none | none | none |

EXAMPLES ##8-15

|  | Example | | | | | | | |
|---|---|---|---|---|---|---|---|---|
|  | 8 | 9 | 10 | 11 | 12 | 13 | 14 | 15 |
| 12 melt index high density polyethylene | 20% | 20% | 25% | 25% | 25% | 30% | 30% | 30% |
| stearic acid | 28% | 38% | 28% | 38% | 48% | 28% | 38% | 48% |
| erasability | 8.3 | 8.4 | 9.2 | 8.8 | 8.8 | 9.0 | 9.8 | 9.8 |
| ease of application | 8.0 | 8.4 | 7.2 | 8.5 | 7.1 | 6.7 | 7.2 | 5.6 |
| tip breaking strength | 6.4 | 5.1 | 6.4 | 6.1 | 6.8 | 7.8 | 8.7 | 8.2 |
| barrel breaking strength | — | 10.6 | 10.9 | 12.9 | 12.2 | 13.7 | 14.3 | 14.3 |
| sharpenability | 10.0 | 10.0 | 10.0 | 10.0 | 10.0 | 10.0 | 10.0 | 10.0 |
| bloom | none | none | none | none | none | none | none | none |

As a result of these trials, it was found that the best balance of properties in a high density polyethylene and stearic acid system were produced by a matrix blend of 25% of an intermediate melt index (M.I.=12) high density polyethylene with 38% stearic acid. Increasing the level of high density polyethylene resulted in improved eraseability, increased tip breaking strength, and barrel breaking strength, but it also resulted in somewhat reduced ease of application.

The following are certain specific formulations of the composition of the invention.

EXAMPLE #11

The following components were combined in an electrically heated C.W. Brabender Plasti-Corder.

| High melting paraffin wax (142° F.) | 17.2 g |
|---|---|
| Stearic acid | 17.8 g |
| 12 M.I. HDPE | 11.8 g |
| Calcium stearate | 0.2 g |
| Naphthol red pigment | 3.0 g |
| Total charge | 50.0 g |

The heating chamber was set to 284° F. (140° C.). The paraffin wax and stearic acid were added when the chamber temperature had risen to about 104° F. (40° C.). When the melt temperature had risen to 158° F (70° C), the HDPE pellets were added. The melt temperature was allowed to reach 284° F. (140° C.), and mixing was continued until a homogeneous melt resulted. The calcium stearate and pigment were then added. Heat was reduced. Mixing was continued for about 40 minutes after the temperature had dropped to 248° F. (120° C.) or lower. The mix was discharged and molded.

Test crayons were molded by placing chips of the above formulation in a 4" long by 5/16" diameter aluminum mold, electrically heating to about 300° F. (149° C.), adding additional chips to fill the crayon cavity, and then cooling in a tray of room temperature water. After it had solidified, the test crayon was pushed from the mold.

EXAMPLE #4

The same procedure was followed as in Example 11, but the ingredients used were:

| | |
|---|---|
| High melting paraffin wax (142° F.) | 19.5 g |
| Stearic acid | 13.2 g |
| 17 M.I. HDPE | 14.1 g |
| Calcium stearate | 0.2 g |
| Naphthol red pigment | 3.0 g |
| Total charge | 50.0 g |

The properties of the formulations of Examples 4 and 11 were given previously.

From the foregoing description and examples, it is apparent that the objects of the present invention have been achieved. While only certain embodiments have been set forth, alternative embodiments and various modifications will be apparent to those skilled in the art. These and other alternatives and modifications are considered equivalents and within the spirit and scope of the present invention.

What is claimed is:

1. A solid marking composition comprising:
   (a) from about 15% up to about 50% by weight of a polyethylene resin component having a specific gravity in the range of from about 0.95 to about 0.96;
   (b) from about 20% up too about 55% by weight of a compatible plasticizer; and,
   (c) a pigment, said composition being substantially free of polyethylene resins having a specific gravity of less than about 0.95.

2. A composition according to claim 1, wherein said polyethylene resin component is present in an amount of from about 20% up to about 40% by weight.

3. A composition according to claim 1, wherein said polyethylene resin component is present in an amount of from about 25% up to about 35% by weight.

4. A composition according to claim 1, wherein said compatible plasticizer has a melting point in the range of from about 125° F. up to about 145° F.

5. A composition according to claim 1, wherein said compatible plasticizer is a paraffin wax.

6. A composition according to claim 1, wherein said pigment is selected from the group consisting of inorganic pigments, organic pigments, and mixtures thereof.

7. A composition according to claim 6, wherein said inorganic pigment is selected from the group consisting of iron blue, iron oxides, zinc oxide, ultramarine blue, titanium dioxide, and mixtures thereof.

8. A composition according to claim 6, wherein said organic pigment is selected from the group consisting of azo, naphthol, and phthalo pigments.

9. A composition according to claim 1, wherein said pigment further comprises a component selected from the group consisting of acid dye toners, basic dye toners, acid dye lakes, basic dye lakes, and mixtures thereof.

10. A composition according to claim 1, wherein said pigment has a particle size in the range of from about 0.1 microns up to about 25 microns.

11. A composition according to claim 10, wherein said pigment has a particle size in the range of from about 0.3 microns up to about 20 microns.

12. A composition according to claim 11, wherein said pigment has a particle size in the range of from about 0.5 microns up to about 15 microns.

13. A composition according to claim 1, further comprising a pigment dispersing agent.

14. A composition according to claim 13, wherein said pigment dispersing agent is present in an amount of from about 5% up to about 40% by weight.

15. A composition according to claim 14, wherein said pigment dispersing agent is present in an amount of about 35% by weight of the composition.

16. A composition according to claim 13, wherein said pigment dispersing agent comprises at least one fatty acid having from 14 to 24 carbon atoms.

17. A composition according to claim 14, wherein said pigment dispersing agent comprises stearic acid.

18. A composition according to claim 1, further comprising a pigment extender.

19. A composition according to claim 18, wherein said pigment extender is present in an amount of up to about 20% by weight of the composition.

20. A composition according to claim 19, wherein said pigment extender is present in an amount of from about 5% up to about 10% by weight of the composition.

21. A composition according to claim 18, wherein said pigment extender is selected from the group consisting of calcium carbonate, talc, silica, clays, and feldspars.

22. A composition according to claim 1, further comprising a mold release agent.

23. A composition according to claim 22, wherein said mold release agent is a Group IIA metal salt of a fatty acid.

24. A composition according to claim 23, wherein said mold release agent is calcium stearate.

25. A composition according to claim 1, further comprising an oxidative stabilizer.

26. A composition according to claim 1, further comprising a UV stabilizer.

27. An elongated, generally cylindrical marking instrument formed of a solid marking composition according to claim 1.

28. A marking instrument according to claim 27 having a diameter of about 5/16 inch and having a tip breaking strength of at leant about 5 pounds, a barrel breaking strength of at least about 9 pounds, and being essentially free of bloom.

29. A solid marking composition comprising:
   (a) from about 25% up to about 35% by weight of a polyethylene resin component having a specific gravity of from about 0.95 to about 0.96;
   (b) from about 20% up to about 55% by weight of a paraffin wax having a melting point in the range of from about 125° F. up too about 145° F.; and,
   (c) from about 3% up to about 20% by weight of a pigment, said pigment being selected from the group consisting of inorganic pigments, organic pigments, and mixtures thereof,
   said composition being substantially free of polyethylene resins having a specific gravity of less than about 0.95.

30. A composition according to claim 29 further comprising from about 5% up to about 40% by weight of a pigment dispersing agent, said pigment dispersing agent comprising at least one fatty acid having from 14 to 24 carbon atoms.

* * * * *

UNITED STATES PATENT AND TRADEMARK OFFICE
CERTIFICATE OF CORRECTION

PATENT NO. : 5,055,498

DATED : October 8, 1991

INVENTOR(S) : Armand E. Brachman

It is certified that error appears in the above-identified patent and that said Letters Patent is hereby corrected as shown below:

Column 9, Claim 1, line 30 - "too" should be --to--;

Column 10, Claim 28, line 46 - "leant" should be --least--;

Column 10, Claim 29, line 55 - "too" should be --to--.

Signed and Sealed this

Twentieth Day of April, 1993

Attest:

MICHAEL K. KIRK

*Attesting Officer*　　　Acting Commissioner of Patents and Trademarks